United States Patent
Sasidharan et al.

(10) Patent No.: US 7,733,774 B1
(45) Date of Patent: Jun. 8, 2010

(54) METHOD AND APPARATUS FOR DETECTING PROCESS FAILURE

(75) Inventors: Prasanth Nalini Sasidharan, Kerala (IN); Asmita Jagtap, Pune (IN); Harshad Toke, Pune (IN)

(73) Assignee: Symantec Corporation, Mountain View, CA (US)

( * ) Notice: Subject to any disclaimer, the term of this patent is extended or adjusted under 35 U.S.C. 154(b) by 420 days.

(21) Appl. No.: 11/811,305

(22) Filed: Jun. 7, 2007

(51) Int. Cl.
*H04L 12/26* (2006.01)
*H04J 3/14* (2006.01)

(52) U.S. Cl. .................. 370/230; 370/235; 370/250; 709/224

(58) Field of Classification Search .................. None
See application file for complete search history.

(56) References Cited

U.S. PATENT DOCUMENTS

| | | | |
|---|---|---|---|
| 6,928,585 B2 | 8/2005 | Bartley | |
| 7,047,536 B1* | 5/2006 | Duncan et al. | 719/330 |
| 7,398,317 B2* | 7/2008 | Chen et al. | 709/229 |
| 2002/0191604 A1* | 12/2002 | Mitchell et al. | 370/389 |
| 2003/0105850 A1* | 6/2003 | Lean et al. | 709/223 |
| 2005/0180419 A1* | 8/2005 | Park et al. | 370/389 |
| 2006/0198300 A1* | 9/2006 | Li et al. | 370/229 |
| 2007/0070916 A1* | 3/2007 | Lehane et al. | 370/252 |
| 2007/0130324 A1* | 6/2007 | Wang | 709/224 |
| 2008/0170501 A1* | 7/2008 | Patel et al. | 370/235 |

OTHER PUBLICATIONS

"Process Monitor How-To for Linux," downloaded from web site http://www.linuxjunkies.org/html/Process-Monitor-HOWTO.html on Dec. 28, 2007.
Zhang, Ronghua et al., "Efficient TCP Connection Failover in Web Server Clusters," IEEE INFOCOM 2004.
Alvisi, Lorenzo et al., "Wrapping Server-Side TCP to Mask Connection Failures," downloaded from web site http://www.cs.ucsd.edu/~dzagorod/research/pubs/alvisi_et_al-fttcp-infocom01.pdf on Jan. 2, 2008.
Marwah, Manish et al., "A System Demonstration of ST-TCP," downloaded from web site http://whitepapers.techrepublic.com.com/whitepaper.aspx?docid=326518 on Jan. 2, 2008.

* cited by examiner

*Primary Examiner*—Chi H Pham
*Assistant Examiner*—Soon-Dong D Hyun
(74) *Attorney, Agent, or Firm*—Moser IP Law Group

(57) ABSTRACT

A method and apparatus for monitoring a process to determine when an abnormal process exit occurs comprising monitoring events related to the process and detecting a communication connection closing without receiving a notification of an exit event for the process. On detection of an abnormal exit of a process associated with the communication connection, the method and apparatus provide special failover processing including, for example, a TCP connection failover process.

25 Claims, 6 Drawing Sheets

METHOD AND APPARATUS FOR DETECTING PROCESS FAILURE

BACKGROUND OF THE INVENTION

1. Field of the Invention

Embodiments of the present invention generally relate to techniques for monitoring processes running on a computer system and, more particularly, to a method and apparatus for monitoring at least one process during an abnormal exit of the process.

2. Description of the Related Art

Monitoring computer system processes include monitoring process activities, including starts and exits of a process among other process activities. Monitoring a process also helps detect process exit events and determine if the process exited gracefully or abnormally, so that an appropriate corrective action may be taken. Most conventional operating systems provide a mechanism for monitoring processes having ancestral relationships, for example, a parent process may monitor various child processes. Further, in POSIX compliant operating systems, system calls such as, "wait(2)", "waitpid(2)", "wait4(2)" and the like provide a mechanism to monitor child processes. However, such operating systems do not provide a mechanism for monitoring processes without ancestral relationships to a parent process.

Various efforts have been made to provide a mechanism to monitor processes without an ancestral relationship between the processes. One approach is to have a monitoring process continuously polling the processes to be monitored. The polling is done at regular intervals to check the status of the process. This approach has many limitations. For example, an instantaneous notification of a process exit is not possible, and further, repeated polling by the monitoring process wastes valuable central processing unit (CPU) resources. More importantly, this approach does not provide information on whether the process exited gracefully or abnormally.

Another approach is to re-architect the processes to be monitored to make them co-operative with the monitoring process. However, this may require modifying the existing processes and applications, and therefore such a solution is not considered a viable approach because the costs required to implement such modifications generally outweighs the benefits.

Further, in various computing environments, when a process exits abnormally and an abnormal exit of the process (a failed process) is detected, a special processing technique, such as a failover process, is invoked. In case of an abnormal exit of the process associated with a Transmission Control Protocol (TCP) connection, the failover process may be needed for the TCP connection. In general, a TCP connection includes a local end and a remote end. The local end of the TCP connection is associated with the process and the remote end of the TCP connection is connected to a user computer. In cases of a TCP connection being failed over, the failed process associated with the connection is re-initiated or another process capable of handling the failed TCP connection is initiated. One of the major unmet challenges while failing over the TCP connection is that the remote end of the TCP connection should not be disturbed.

Accordingly, there exists a need to provide a method and apparatus for monitoring processes to detect abnormal process exit.

SUMMARY OF THE INVENTION

The present invention generally is a method and apparatus for monitoring a computer process, and includes monitoring events related to the process and detecting a communication connection closing prior to receiving a notification of an exit event for the process. Ina further embodiment, the present invention provides a method and apparatus for detecting an abnormal exit of a process having a communication connection and providing a failover process for the communication connection.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

While the invention is described herein by way of example using several embodiments and illustrative drawings, those skilled in the art will recognize that the invention is not limited to the embodiments of drawing or drawings described. It should be understood that the drawings and detailed description thereto are not intended to limit the invention to the particular form disclosed, but on the contrary, the invention is to cover all modification, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. Further, the word "a" means "at least one" unless otherwise mentioned.

The term "normal exit" includes "normal process exit", "normal process termination", "graceful exit", "graceful process exit", and the like; the term "TCP segments" includes "TCP packets", "TCP segments", "TCP bits", "TCP flags" and the like; the term "abnormal exit" includes "abnormal termination", "abnormal process termination", "process failure", "failure", and the like; the term, "notification of an exit event" includes "exit event", "process exit event", and the like; the term, "notification of an start event" includes "start event", "process start event", and the like.

DETAILED DESCRIPTION

Figure 1:
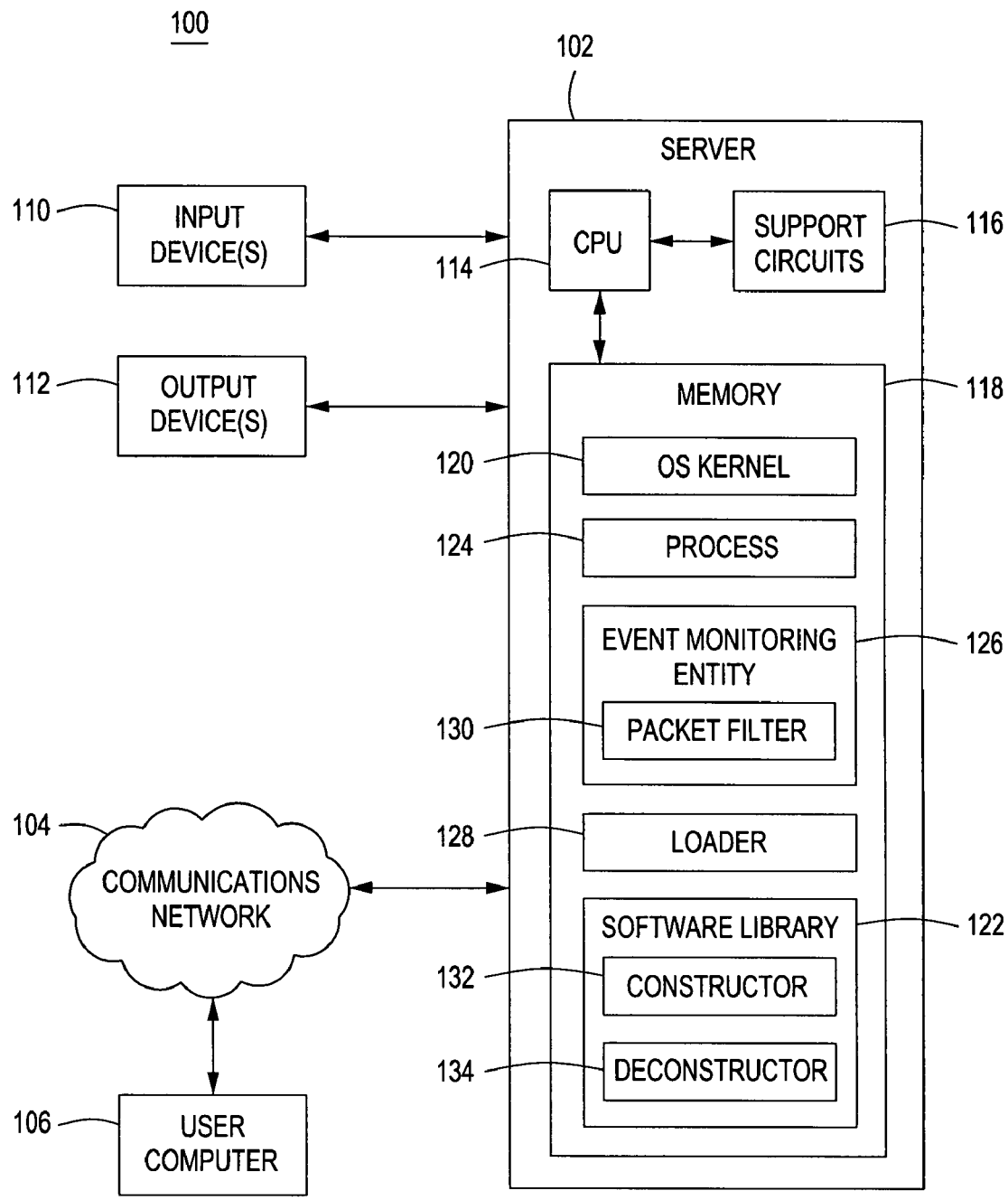
FIG. 1 is a schematic representation of a computer system according various embodiments of the present invention.

FIG. 1 is a schematic illustration of a computer system 100 according various embodiments of the present invention. The computer system 100 comprises at least one server 102 (one of which is shown), a communication network 104, and at least one user computer 106 (one of which is shown). The server 102 is a server computer running server applications and providing various services on the communication network 104. The user computer 106 is, generally, a client computer in a client-server system. The user computer 106 accesses remote services from the server through the communication network 104. The communication network 104 may be one of many communication networks or combination of networks that are available to communicate information from a use computer to other computers connected to the communication network 104. The communication network 104 generally forms a portion of the internet which may comprise various sub-networks such as Ethernet networks, local area networks, wide area networks, wireless networks, and the like.

The server computer 102 comprises, without limitation, input/output devices, such as an input device 110 and an output device 112, a CPU 114, support circuits 116, and a memory 118. The CPU 114 may be one or more of any commercially available microprocessors or microcontrollers. The support circuits 116 comprise circuits and devices that are used in support of the operation of the CPU 114. For example, the input device 110, the output device 112, the CPU 114, and the memory 118 are inter-connected through the support circuits 116. Such support circuits include, for example, cache, input/output circuits, system bus, PCI bus and the like. Those skilled in the art will appreciate that the hardware depicted in the FIG. 1 may vary from one computer system to another. For example, other peripheral devices, such as optical disk drives, graphics card, data storage devices, various other input devices and the like, may also be used in addition to or in place of the hardware depicted.

Various types of software processes and information are resident within the memory 118. As illustrated in FIG. 1, for example, various processes such as an Operating System (OS) kernel 120, a software library 122, a process 124, an event monitoring entity 126, a loader 128, a packet filter 130, a constructor 132, and a destructor 134 are resident in the memory 118.

For the purpose of discussion, the process 124 of FIG. 1 is a process to be monitored. The software library 122 is associated with the process 124 such that when the process 124 starts, the software library 122 is loaded. The process 124 is coupled to a standard linker/loader such as loader 128.

The software library 122 is implemented in such a way that an initialization function such as the constructor 132 is called when the software library 122 is loaded and a cleanup function such as the destructor 134 is called when the software library 122 is unloaded. The software library 122 may be linked to the process 124 at the time of the building the process binary of the process 124. The software library 122 may be a shared dynamic linked library (dll), user space library, static user space library and the like. Alternatively, the software library 122 may also be loaded with the process 124 at run-time by pre-loading it using standard linker/loader features. For example, the standard linker/loaders such as the loader 128 on most of the OS use the "LD_PRELOAD" environment variable to get a list of any dynamic linked libraries to be loaded along with the process binary when the process 124 is started. As will be apparent to one skilled in the art, though the present invention uses the standard linker/loader features for preloading dynamic libraries, it is not limited to any particular operating system or computer architecture. As used herein, the term "software library" includes "user space library", "thin software library", and the like.

The event monitoring entity 126 may reside in the OS kernel 120 on the server system 102. In other embodiments, the event monitoring entity 126 may be running on a user system 106. In certain embodiments, the event monitoring entity 126 may be implemented on a separate device (not shown in the figures) connected to the server 102 running the process 124. It is appreciated here that the event monitoring entity 126 may or may not have any ancestral relationship with the process 124. As used herein, the term "event monitoring entity" includes "process event manager", "process event monitor", and the like. In an embodiment of the invention that handles connection failovers (as described below with respect to FIG. 6), the event monitoring entity 126, in general, comprises a connection monitoring entity such as the packet filter 130. The packet filter 130 is configured to have an access to TCP segments belonging to a TCP connection.

The process 124 is started with the software library 122 loaded as discussed above. On startup of the process 124, a notification of "start event" is sent by the software library 122 to the event monitoring entity 126 over a communication connection (not shown). The communication connection includes, without limitation, Inter Process channel (IPC) channel, TCP connection and the like.

Figure 2:
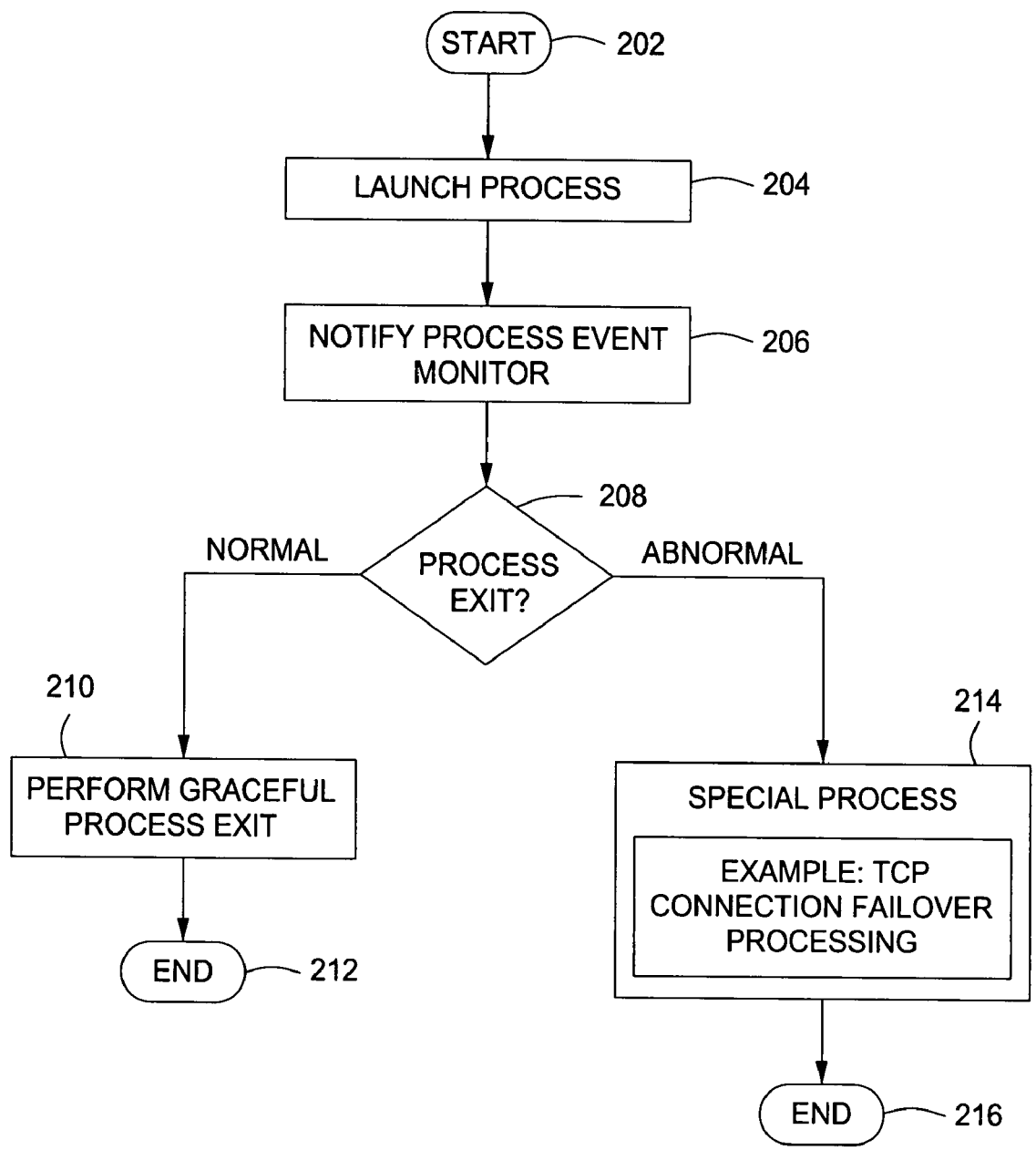
FIG. 2 is a flow chart illustrating an overview of a method for a failover process on abnormal exit of a process according to various embodiments of the present invention.

FIG. 2 is a flow chart illustrating a method 200 for detecting a process failure according to various embodiments of the present invention. The method 200 starts at step 202, and at step 204 the process 124 is launched. At step 206, a notification of "start event" is sent (or intercepted or otherwise coupled) to the event monitoring entity 126. At step 208, the method 200 determines the process exit status. If the process exit status is normal, the process performs a graceful exit at step 210 and sends a notification of the "exit event" to the process event manager, and the method 200 ends at step 212 in case of normal process exit. However, if at step 208, the process exit status is abnormal, the method 200 executes a special process 214. The special process 214 that is performed depends upon the type of process that has abnormally exited. Such a special process includes, for example, invoking a process or computer failover technique or invoking TCP connection failover processing on an abnormal exit of the process associated with the TCP connection. The method 200 ends at step 216 for an abnormal process exit.

Figure 3:
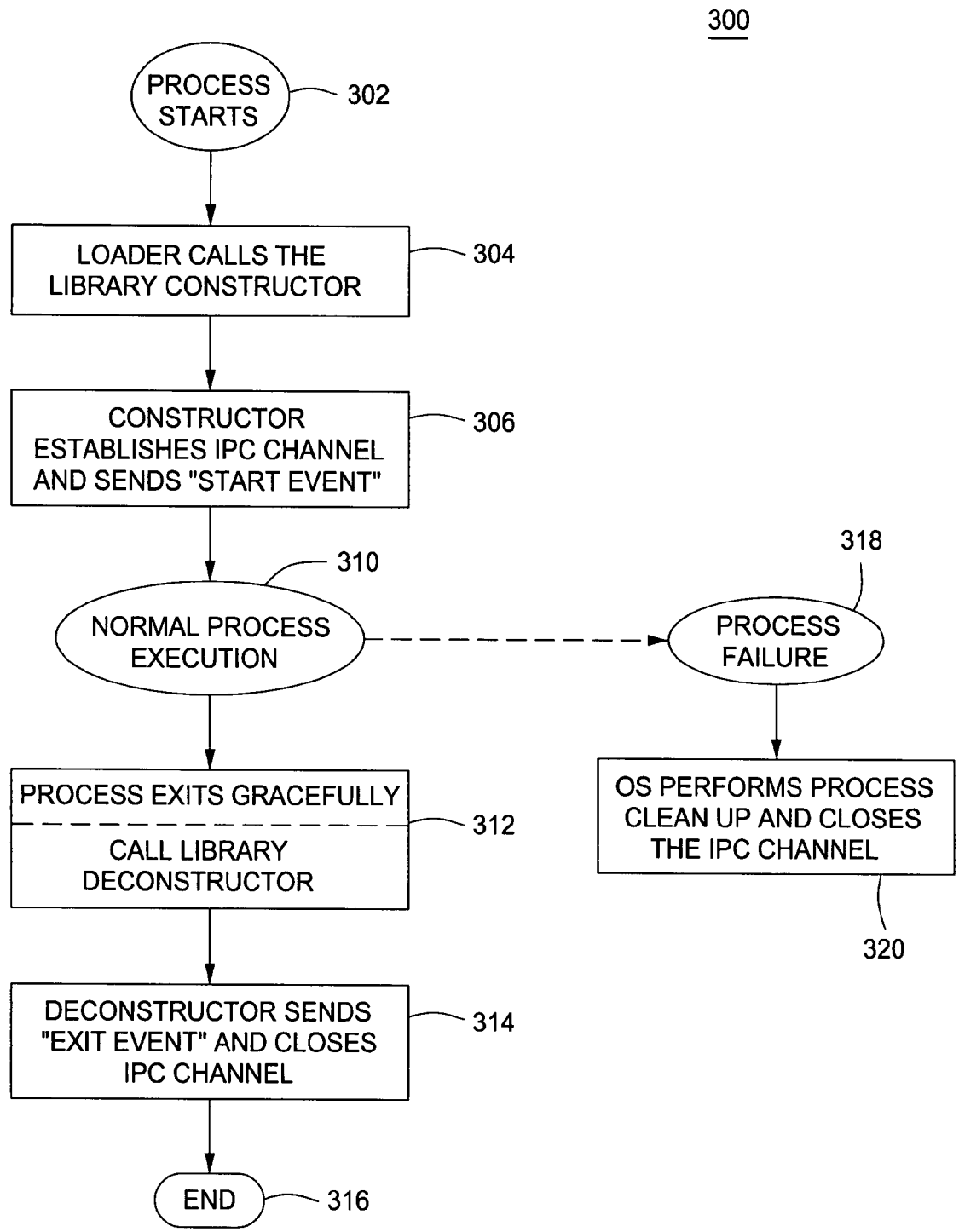
FIG. 3 is a flow chart illustrating a method of a process to be monitored according to various embodiments of the present invention.

FIG. 3 is a flow chart illustrating a method 300 of the process 124 to be monitored according to various embodiments of the present invention. The method 300 starts at step 302 with the start of the process 124. At step 304, the loader 128 calls the library constructor 132. At step 306, the constructor 132 establishes IPC channel and sends a notification of "start event". At step 310, the process continues to execute normally. At step 312, the process exits normally and the loader 128 calls the library destructor 134. At step 314, the destructor 134 sends a notification of "exit event" and also the IPC channel is closed. The method ends at step 316. However, during the normal process execution of the step 310, if there is process failure, illustrated by step 318, then at step 320 OS performs process clean up and closes the IPC channel. In this case the library destructor 134 is not invoked, and therefore no notification of the "exit event" is sent.

Figure 4:
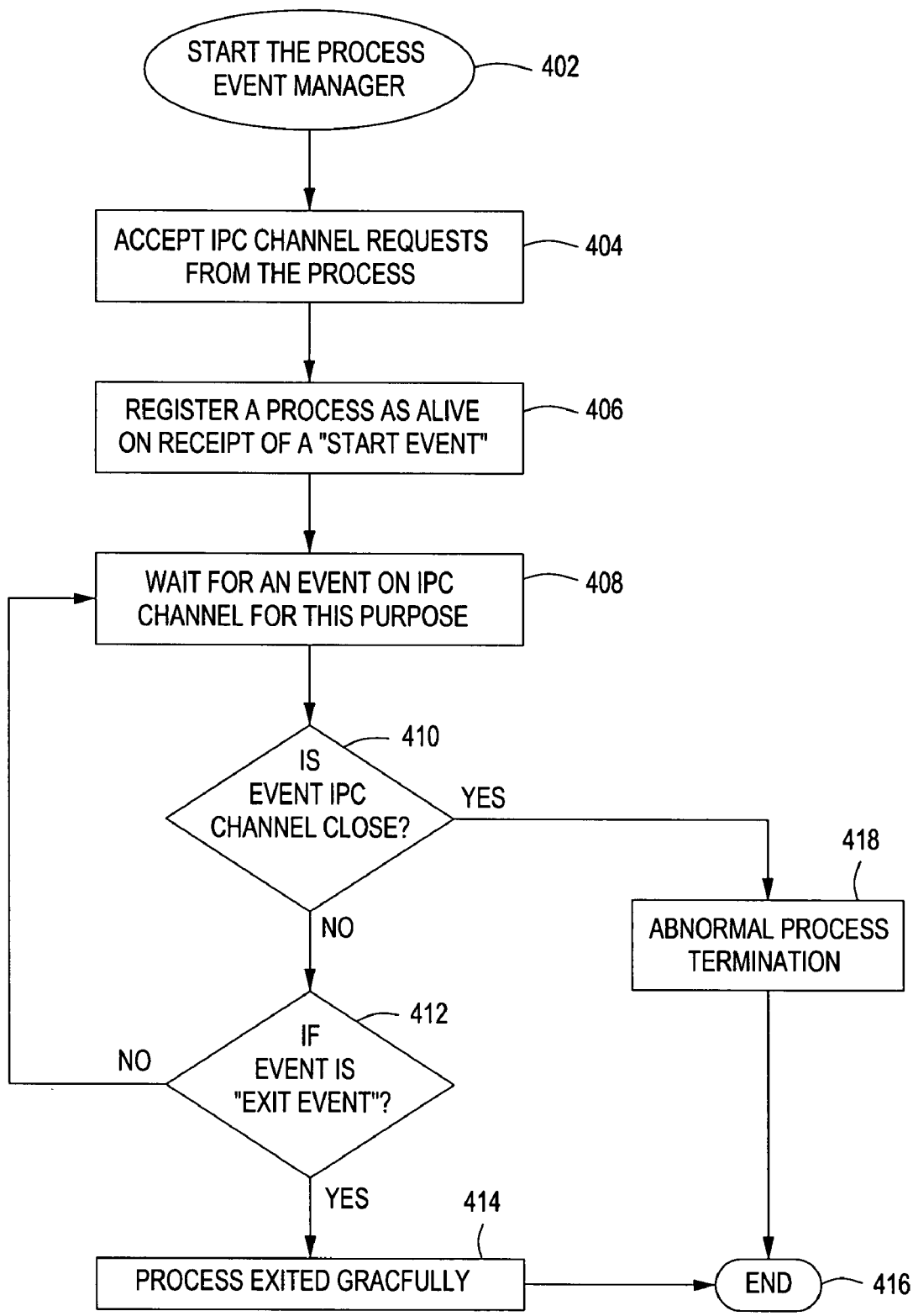
FIG. 4 is a flow chart illustrating a method used by an event monitoring entity for monitoring a process according to various embodiments of the present invention.

FIG. 4 is a flow chart illustrating a method 400 for monitoring the process 124, according to various embodiments of the present invention. The method 400 starts at step 402 with the start of the event monitoring entity 126. The process 124 is started with the software library 122 preloaded. The constructor 132 establishes a communication connection such as an IPC channel with the event monitoring entity 126. At step 404, the event monitoring entity accepts IPC channel request from the process 124 and a notification of "start event" is sent to the event monitoring entity 126 over an IPC channel. In other embodiments of the invention, the events are captures, intercepted, or otherwise coupled to the event monitoring entity 126.

At step 406, the event monitoring entity registers the process as alive on receiving a notification of the "start event". The event monitoring entity 126 may also receive various other information, such as Process ID (PID) and like to track which processes are "alive". At step 408, the event monitoring entity waits for an event on IPC channel for the process 124. At step 410, a determination of the event being "IPC channel close" is made. If the event is not "IPC channel close", the method 400 proceeds to step 412, where the determination of process event being an "exit event" is made. At step 412, if the event is an "exit event", the process 124 exits gracefully at step 414, and the method 400 ends at step 416. On the other hand, at the step 412, if the event is not an "exit event", the method 400 proceeds back to the step 408 and waits for an event on the IPC channel. Referring back to the step 410, if the event is "IPC channel close", the method 400 proceeds to step 418. In cases of abnormal exit of the process 124, the IPC channel may be closed by the OS. In such cases, at step 418, the event monitoring entity 126 detects abnormal termination of the process. The method 400 then ends at step 416. According to certain aspects of the invention, if the event monitoring entity 126 detects the closure of the communication connection without receiving an "exit event" notification, the event monitoring entity 126 detects an abnormal exit of the process 124.

According certain other aspects of the invention, on detection of an abnormal exit of the process 124, a special processing may be invoked further to the abnormal exit. Such special processing includes, for example, failover processing of various processes, connections within the computer system or the communications network. A failover process includes reduced mode process(es) or standby mode process(es) that may be automatically invoked in case of an abnormal exit of the process. Failover processes are desired to provide continuous availability and high degree of reliability of data processing systems.

Figure 5:
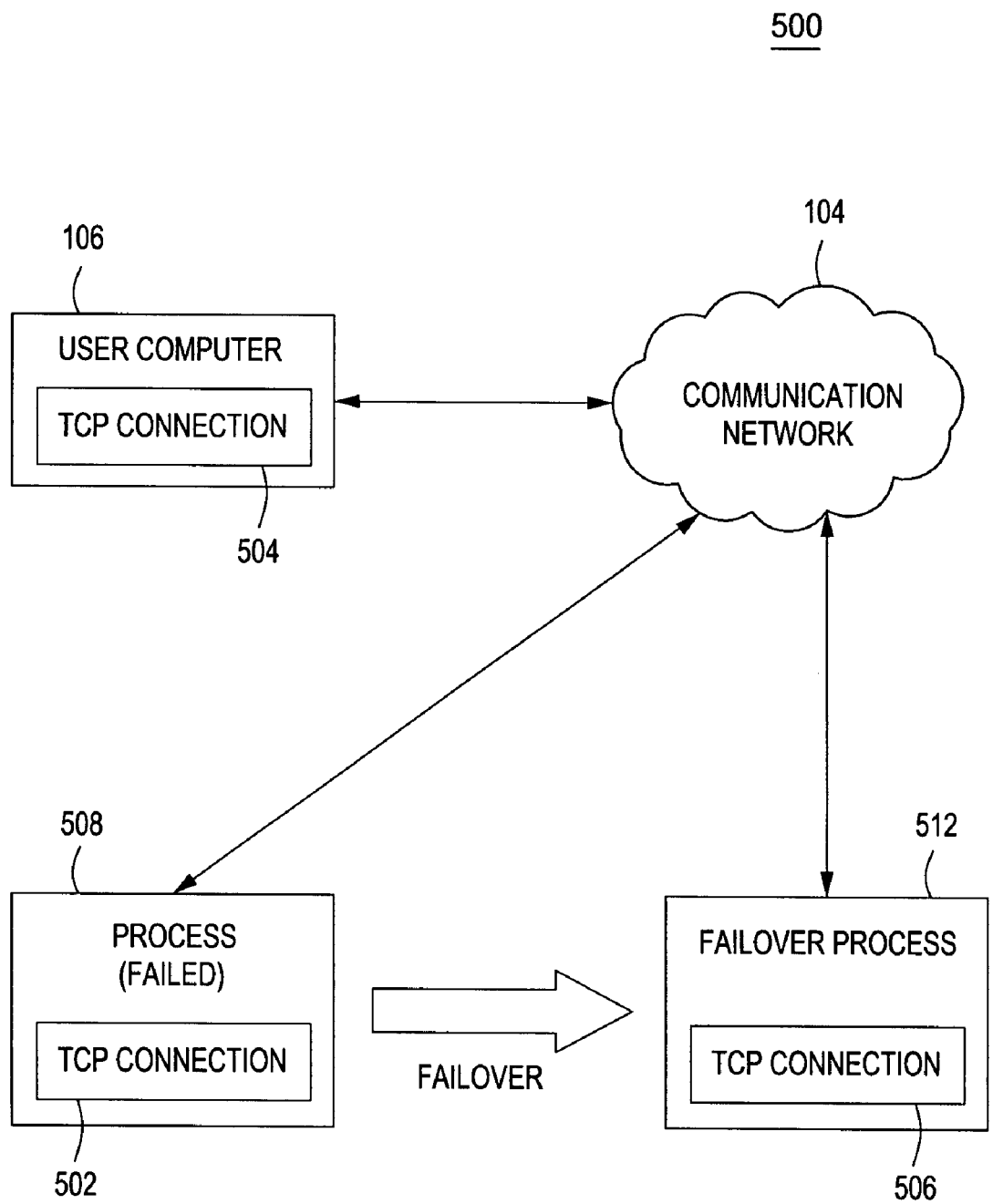
FIG. 5 is a schematic representation illustrating failover of the TCP connection according to various embodiments of the present invention.

According to various embodiments of the present invention, the special processing includes a failover processing of a TCP connection, on an abnormal exit of the process associated with the TCP connection. FIG. 5 is a schematic representation illustrating failover of the TCP connection according to various embodiments of the present invention. The TCP connection is established across the user computer 106 through the communication network 104. The TCP connection comprises a local end 502 and a remote end 504. The local end 502 of the TCP connection may be associated with the server system 102 (as shown in FIG. 1) on which the process 124 is running. The remote end 504 may be associated with the user computer 106 communicating with the server 102 through the communication network 104. In other embodiments, the TCP connection may be between to servers. In either situation, the process of failing over the TCP connection is the same.

The process 124 associated with the TCP connection running on the server 102, in its failed state is represented by block 508. On the failure or abnormal exit of the process 124, the failover process is invoked. Failover processing in this context requires that the remote end 504 stays open, despite the process failure or abnormal process exit. Accordingly, after failing over of the process, the TCP connection switches from local end 502 to a failover process represented by block 512, having a new local end 506. This switching over of the connection from one local end to another, advantageously enables the failover process of the block 512 to take over from the point of failure without significantly impacting a user experience. Examples of failover processes include the failed process itself, other similar processes, recovery processes on the same computer or a different computer.

Through continuous process monitoring as described above, the process event manager 126 is able to detect the failure of a process and then use a packet filter to filter (i.e., remove) any information (e.g., FIN or RESET flags) from the stream that could cause the remote endpoint to disconnect. By filtering such information upon detection of a process failure, the TCP connection can be failed over using various fail over techniques. The present invention provides an ability to detect process failure and use a packet filter to facilitate TCP connection failover.

According to various embodiments of the present invention, a failover processing of a TCP connection is invoked when the process 124 associated with the TCP connection exits abnormally. During the failover processing for the TCP connection it is desirable the remote end 504 of the TCP connection in an open state during failover of the TCP connection. The state of keeping the remote end of the TCP connection open is referred to as a half open state of the TCP connection. While the local end 502 of the TCP connection is closed, the remote end 504 of the TCP connection is alive and capable of sending and receiving data, and the remote end 504 does not have knowledge of the closure of the local end 502. In one aspect, the failover processing requires that TCP connections must be moved from the failed process 508 having the local end 502 to the failover process 512 (e.g. restarted process) with a new local end 506, without disconnecting the user computer 106 with a remote end 504. According to certain embodiments, the present invention advantageously performs this function by ensuring that packets containing "FIN' or "RESET" flags are filtered by the process event manager 126 using a packet filter 130. The remote end 504 of the TCP connection remains connected, while the local end 502 of the TCP connection is moved to the restarted process at new local end 506, during a failover. It may be noted that in certain embodiments, if the process failed because of a server failure, the process may be moved over to a completely different server system.

Figure 6:
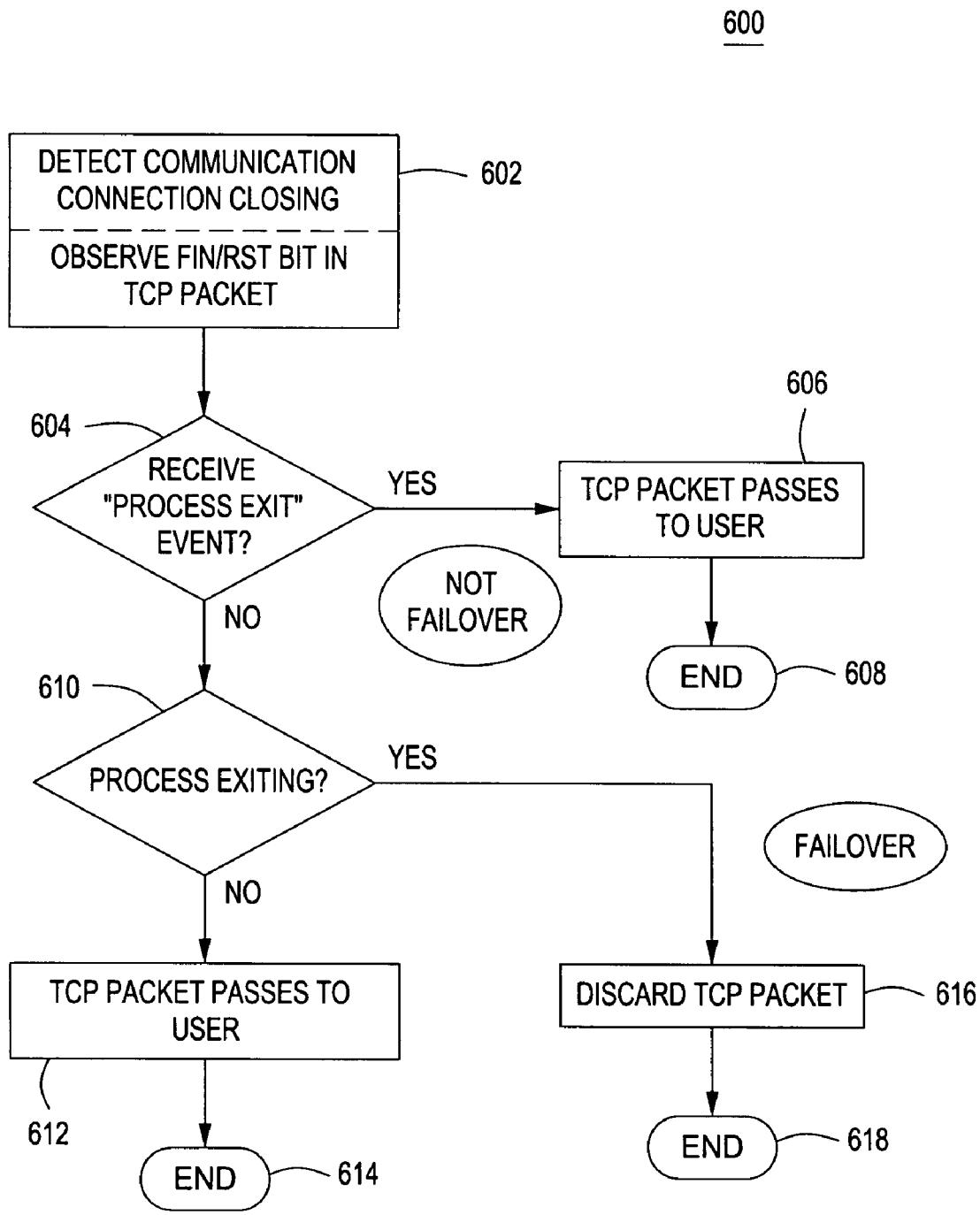
FIG. 6 is a flow chart illustrating a method of a failover process for the TCP connection according to various embodiments of the present invention.

FIG. 6 is a flow chart illustrating a method of a failover process for the TCP connection according to various embodiments of the present invention. The method 600 starts at step 602, where the process event manager 126 detects the communication connection closing. The packet filter 130 observes the TCP segments in the TCP connection. The packet filter 130 is configured to have an access to the TCP segments belonging to the TCP connection. The packet filter 130 performs deep packet inspection of the TCP segments and is configured to perform various functions on the TCP segments, such as discarding TCP segments, letting TCP segments pass through, monitoring the contents of TCP segments, and the like. Embodiments of the present invention, in which process event manager 126 is external to the TCP/IP stack, include the connection monitoring entity having an access to the TCP segments belonging to the TCP connection, so that the connection monitoring entity may perform similar functions on the TCP connections. At step 604, a determination is made of the receipt of a notification of "exit event" for the process 124 associated with the TCP connection. If the notification of process exit was received the method 600 proceeds to step 606, where the TCP segments including "FIN' or "RESET" bits are allowed to pass to the TCP connection by the packet filter 130. These TCP segments with "FIN' or "RESET" bits then close the TCP connection associated with the process, and the method ends at step 608. On the other hand, at the step 604, if the connection monitoring entity does not receive the notification of the "exit event", the method proceeds to step 610 and the packet filter 130 checks for the state of the process 124 as to whether the process 124 is exiting or not exiting. If the process 124 associated with the TCP connection invokes "close(2)" system call on the connection "file descriptor(fd)" explicitly and the process 124 is not exiting, the method 600 proceeds to step 612, at which the TCP segments are passed to the remote end of the TCP connection. The method ends at step 614. However, if at the step 610, the process is exiting, the failover process is invoked for the TCP connection, according to which at step 616, the packet filter 130 prevents the transmission of the TCP segments to the remote end of the connection. Therefore, on an abnormal exit of the process associated with a TCP connection, the failover process for the TCP connection is invoked and the transmission of TCP segments meant to close the remote endpoint of the connection are discarded and the method 600 ends at step 618.

Generally, there are various modes of closing the TCP connection. Following case examples describes the operation of the algorithm for each mode or case. The implementation of these examples is assumed to be on GNU/Linux; however, those skilled in the art will appreciate that these concepts may be extended to other environments within the scope of the present invention.

Case 1: The process associated with the TCP connection exits abnormally. When the packet filter 130 observes "FIN' or "RESET" segments set on the TCP connection before receiving a notification of "exit event" for the process, the packet filter 130 checks if the state of the process is "PF_EXITING". In case of the abnormal exit of the process state will be "PF_EXITING". Therefore, the packet filter 130 will prevent the transmission of "FIN' OR "RESET" segments to the remote end of the TCP connection. The packet filter 130 blocks the TCP segments and may emulate a four way TCP connection closing procedures to clean up the local TCP end point.

Case 2: The process associated with the TCP connection invokes "close(2)" system call on the connection "file descriptor(fd)" explicitly. The packet filter 130 observes for "FIN' OR "RESET" TCP segments before receiving a notification of "exit event" for the process, and the packet filter 130 checks if the state of the process is PF_EXITING. In this case, the state of the process will not be "PF_EXITING". Therefore, the packet filter 130 will allow transmission of the "FIN' OR "RESET" segments to the remote end of the TCP connection.

Case 3: The process associated with the TCP connection exits normally. In this case, the process does not close the connection file descriptor (fd) before exiting. Therefore, the destructor 134 is invoked to send notification of the "exit event" of the process to the connection monitoring entity using the IPC channel. On receiving the "exit event", the connection monitoring entity determines all the connections associated with the process and allows transmission of the "FIN' OR "RESET" segments to the remote end of the TCP connection. Thus, the TCP connection gets closed intentionally.

As will be appreciated by those skilled in the art, various embodiments of the present invention are useful in preparing software fault tolerant systems with high availability and security. In certain aspects, the present invention provides for an method for detecting an abnormal exit of the process, and then invoking a special processing such as, failover processing, after the abnormal exit of the process.

Further, the method and apparatus described herein with reference to detection of an abnormal exit of a process can be implemented in various products, such as clusters of servers, to improve the functionality, reliability and continuous availability of the services provided by a server cluster. Further, in various aspects, the present invention provides for detecting abnormal process exit in TCP connection fail-over technologies like TCF. Furthermore, in certain embodiments the present invention provides for near instantaneous notification of process exit and is more efficient method compared to conventional methods since, it is an event based method as against poll based methods.

While the foregoing is directed to embodiments of the present invention, other and further embodiments of the invention may be devised without departing from the basic scope thereof, and the scope thereof is determined by the claims that follow.

What is claimed is:

1. A method executed on a computer of monitoring a computer process, the method comprising:
    monitoring events related to the computer process using the computer;
    detecting a communication connection closing without receiving a notification of an exit event for the computer process using the computer; and
    invoking a special processing on the computer on detection of the communication connection closing, wherein the special processing comprises allowing transmission of data segments to a remote end of the communication connection only on a normal exit of the computer process or the communication connection being intentionally closed by the process.

2. The method of claim 1, wherein the communication connection is an inter-process communication (IPC) channel.

3. The method of claim 1, wherein the communication connection is a transmission control protocol (TCP) connection.

4. The method of claim 1, wherein the special processing is a processing of a TCP connection associated with the process to maintain the connection half open.

5. The method of claim 4, wherein the special processing of a TCP connection associated with the process, and the special processing comprises filtering at least one TCP segment for transmission to the remote end of the TCP connection.

6. The method of claim 5, wherein the data segments are TCP segments.

7. The method of claim 1, wherein the special processing is a failover processing.

8. The method of claim 7, wherein the failover processing comprises
    associating a software library to the process;
    monitoring events from the software library by an event monitoring entity having access to at least one TCP segment belonging to the TCP connection; and filtering at least one TCP segment for transmission to the remote end of the TCP connection.

9. The method of claim 8, wherein the data segments are TCP segments.

10. The method of claim 8, wherein the event monitoring entity is a packet filter.

11. Apparatus for monitoring a process comprising:
means for monitoring events related to the process; and
means for providing functionality used to communicate with the means for monitoring through a communication connection,
wherein the means for monitoring detects the communication connection being closed without receiving a notification of an exit event and wherein the means for monitoring has access to at least one data segment belonging to the communication connection and the means for monitoring allows the transmission of data segments to the remote end of the communication connection only on a normal exit of the process.

12. The apparatus of claim 11, wherein the communication connection is an inter-process communication (IPC) channel.

13. The apparatus of claim 11, wherein the communication connection is a TCP connection.

14. The apparatus of claim 13, further comprising at least one TCP connection, wherein the means for monitoring has access to at least one TCP segment belonging to the TCP connection and the event monitoring entity is configured to filter one or more of the at least one TCP segment.

15. The apparatus of claim 14, wherein the TCP segments are chosen from a group consisting of at least one of FIN and RESET flag sets.

16. The apparatus of claim 13, further comprising at least one TCP connection, wherein the data segments are TCP segments.

17. The apparatus of claim 16, wherein the TCP segments are chosen from a group consisting of at least one of FIN and RESET flag sets.

18. A system for monitoring a process comprising:
first computer;
a second computer comprising an event monitoring entity for monitoring events related to the process; and a software library associated with the process, the software library configured to communicate with the monitoring entity through a communication connection, wherein the event monitoring entity detects the communication connection being closed without receiving a notification of an exit event and wherein the event monitoring entity has access to at least one data segment belonging to the communication connection and the event monitoring entity allows the transmission of data segments to the remote end of the communication connection only on a normal exit of the process; and
a communications network coupling the first computer to the second computer.

19. The apparatus of claim 18, wherein the communication connection is an inter-process communication (IPC) channel.

20. The apparatus of claim 18, wherein the communication connection is a TCP connection between the first computer and the second computer.

21. The apparatus of claim 20, further comprising at least one TCP connection, wherein the event monitoring entity has access to at least one TCP segment belonging to the TCP connection and the event monitoring entity filters one or more of the at least one TCP segment.

22. The apparatus of claim 21, wherein the event monitoring entity comprises a packet filter.

23. The apparatus of claim 21, wherein the TCP segments are chosen from a group consisting of at least one of FIN and RESET flag sets.

24. The apparatus of claim 20, further comprising at least one TCP connection, wherein the data segments are TCP segments.

25. The apparatus of claim 24, wherein the TCP segments are chosen from a group consisting of at least one of FIN and RESET flag sets.

* * * * *